United States Patent [19]

Blackhall et al.

[11] 4,066,601

[45] Jan. 3, 1978

[54] OXADIAZOLE POLYMERS

[75] Inventors: Alexander Blackhall; Donald Lithgow Brydon; John David Seddon, all of Harrogate, England

[73] Assignee: Imperial Chemical Industries Limited, London, England

[21] Appl. No.: 634,751

[22] Filed: Nov. 24, 1975

[30] Foreign Application Priority Data

Nov. 29, 1974 United Kingdom ............... 51783/74

[51] Int. Cl.$^2$ .............................................. C08K 5/36
[52] U.S. Cl. ............................ 260/30.8 R; 260/78.41
[58] Field of Search ..................... 260/30.8 R, 78.41

[56] References Cited

U.S. PATENT DOCUMENTS

| | | | |
|---|---|---|---|
| 2,512,601 | 6/1950 | Bates et al. | 260/78.41 |
| 2,677,677 | 5/1954 | Fisher et al. | 260/78.41 |
| 3,734,893 | 5/1973 | Studinka et al. | 260/30.8 R |
| 3,775,382 | 11/1973 | Brydon | 260/30.8 R |

*Primary Examiner*—William E. Schulz
*Attorney, Agent, or Firm*—Cushman, Darby & Cushman

[57] ABSTRACT

The production of a brominated, polyarylene - 1, 3, 4-oxadiazole solution in oleum involves adding bromine to a precursor solution of the polymer, wherein the polymer is capable of further polymerization and the solution has a viscosity below a predetermined minimum value, and then further polymerizing the brominated polymer to an extent which effects an increase in the viscosity to at least the predetermined minimum value.

6 Claims, No Drawings

OXADIAZOLE POLYMERS

The present invention relates to the production of polyarylene - 1, 3, 4 -oxadiazoles.

Polyarylene - 1, 3, 4 -oxadiazoles have the characteristic repeating unit

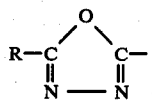

in which R represents an arylene radical. The oxadiazoles may be homopolymers derived from a single dibasic aryl acid, or copolymers derived from two or more different dibasic aryl acids. The invention is particularly concerned with homopolymers of poly - 1, 4 - or - 1, 3 - phenylene - 2, 5 - (1, 3, 4 - oxadiazole) made from terephthalic acid or isophthalic acid, and is more especially concerned with copolymers made from various mixtures of these acids.

The polymers to which the invention relates may be formed into shaped articles, particularly continuous filaments, by the extrusion into an aqueous coagulating medium of such a polymer in solution in oleum or concentrated sulphuric acid.

A solution of a polyarylene - 1, 3, 4 - oxadiazole in oleum or concentrated sulphuric acid may be made in several ways. For example, one or more dicarboxylic acids and hydrazine sulphate may be reacted together in oleum of from 30 to 40% strength, as described in UK Patent Specification No. 1,252,508. As another example, similar reactants may be used but wherein the oleum is from 5 to 20% strength, as described in UK Patent Specification No. 1,339,324. The former method tends to result in such highly viscous solutions that sometimes it may be necessary for dilution with aqueous sulphuric acid or ice to be effected, to achieve a solution viscosity (in poise) of sufficiently lower value to enable it to be readily extrudable in the formation of shaped articles. By the latter method, a solution is formed in situ which may be readily spun into articles without recourse to dilution.

The properties of such shaped articles are enhanced when the polyoxadiazole polymer contains bromine as a substituent. Unfortunately, in many instances, the extrudable polymer solutions have viscosities (dependent upon factors such as solids content, inherent viscosity of the polymer, and temperature) which are too high for bromination treatment to be readily carried out. The problem is that it is difficult to achieve homogeneous mixing of the bromine and the viscous solution with consequent lack of control of the bromine substitution.

Thus it would be highly desirable to have an initial 'precursor' polymer solution having a viscosity below that considered as a minimum for subsequent effective extrusion (hereinafter referred to as the "predetermined minimum value") and being readily polymerisable further to provide a solution suitable for extrusion.

Accordingly, the present invention provides a method for the production of a brominated, polyarylene - 1, 3, 4 - oxadiazole solution having a viscosity at or above a predetermined minimum value (as hereinbefore defined), which comprises:

a. forming a precursor solution of an arylene - 1, 3, 4 - oxadiazole polymer, by reacting at least one dibasic aryl acid in oleum with hydrazine, in amounts such that the polymer has - COOH end groups making it capable of further polymerisation and the solution has a viscosity below the predetermined minimum value;

b. adding bromine to the precursor solution to brominate the polymer;

c. and then adding hydrazine to further polymerise the brominated polymer to an extent which effects an increase in the viscosity of the solution to or above the predetermined minimum value.

The precursor polymer solution in step (a) is readily suited to bromination by virtue of having a low viscosity i.e. below the predetermined minimum value. Generally, it is preferred that the precursor polymer solution should have a viscosity of less than 200 poise at 70° C. Consequently, the final polymer solution should have a viscosity of at least 200 poise at 70° C, and preferably above 300 poise at 70° C. The viscosity of the final polymer solution may depend on such factors as the spinning method to be utilised, the polymer concentration, inherent viscosity, for example. It may be several thousands of poise.

The preferred dibasic aryl acids used in the preparation of the precursor polymer solution are isophthalic and/or terephthalic acids. The oleum used may be in the strength range 5 to 60%, although strengths in the range 20 to 40% may conveniently be utilised.

The dibasic aryl acid(s) are reacted with hydrazine in the oleum medium. The term 'hydrazine' is meant to include suitable derivatives of hydrazine, such as hydrazine salts and acid dihydrazides, for example. The preferred reactant is hydrazine sulphate.

Bromine is added to the precursor polymer solution and the mixture is stirred and heated. Desirably, a small amount of iodine is added. The amount of bromine utilised during the bromination step is sufficient to give a bromine content in the final polymer of 5 to 30%, preferably of 15 to 25%.

The amount of hydrazine (or other suitable derivative) added to the precursor polymer solution, and the amount of — COOH end groups in the polymer, are such that the formation of the oxadiazole linkages (the further polymerisation) is effected to an extent which results in an increase in the solution viscosity to at least the predetermined minimum value.

Polymer solutions made according to the present invention are suitable for the production of shaped articles, particularly continuous filaments. Such filaments may be produced by extrusion of the polymer solution through an orifice into an aqueous coagulating bath, containing for example water or aqueous sulphuric acid. The spinning method utilised may consist of extruding the polymer system through an orifice submerged in the coagulating bath (i.e. conventional wet spinning), or through an orifice situated a small distance above the surface of the coagulating bath (i.e. dry-jet wet spinning). Such spun filaments may be washed free of solvent or coagulant, dried, and then hot drawn, in order to improve their physical properties.

The invention with be further described with reference to the following Examples:

EXAMPLE 1

A mixture of terephthalic acid (166.1 parts), isophthalic acid (166.1 parts) and hydrazine sulphate (257.6 parts) was placed in a reaction flask protected from atmospheric moisture, together with 35% oleum (2289.6 parts). The contents of the flask were stirred and heated to 140° C over a period of 1.5 hours, and then maintained at a temperature of 140° to 145° C for 5 hours with stirring. The resulting copolymer solution was allowed to cool to ambient temperature, and was found to have a viscosity of 57.6 poises at 70° C and 42.7 poises at 90° C. An aliquot of the copolymer solution was pressed between glass plates which were then separated and quenched in water to give a thin film which was washed acid free. The inherent viscosity of the white copolymer was 0.89.

To this 'precursor' copolymer solution was added iodine (0.5 parts) and the temperature was raised to 90° C. Bromine (22 mls) was added, with stirring over a period of 5.5 hours at 90° C, whereafter heating at this temperature range was continued for a further 11.5 hours. After cooling to ambient temperature, unreacted bromine was blown off with dry nitrogen. The brominated copolymer contained 13.2% bromine, had an inherent viscosity of 0.80 and the solution had a viscosity of 55.3 poises at 70° C and 35.1 poises at 90° C.

Hydrazine sulphate (15.6 parts) was added to the brominated copolymer solution and the temperature was raised to 140° C over a period of 1.5 hours whilst stirring. The stirring was continued for a further 6 hours at 140° to 145° C to give a pale brown solution which was allowed to cool to ambient temperature. The resulting solution had a viscosity of 3,983 poises at 70° C and 2,164 poises at 90° C, and the copolymer had an inherent viscosity of 1.68 and contained 14.2% bromine.

EXAMPLE 2

The general procedure was as described for Example 1. A mixture of terephthalic acid (299 parts), isophthalic acid (33.2 parts) and hydrazine sulphate (255 parts) in 35% oleum (2289.6 parts) was reacted to give a 'precursor' copolymer solution which had a viscosity of 43.2 poises at 70° C and 27.2 poises at 90° C, and the copolymer had an inherent viscosity of 0.71.

After bromination with iodine (0.5 parts) and bromine (38 mls) the brominated copolymer contained 20.8% bromine, had an inherent viscosity of 0.55, and the solution had a viscosity of 59.7 poises at 70° C and 28.3 poises at 90° C.

Hydrazine sulphate (18.2 parts) was then added to give a final copolymer solution wherein the copolymer contained 19.7% bromine, had an inherent viscosity of 1.58, and the solution had a viscosity of 13,398 poises at 70° C and 6,130 poises at 90° C.

EXAMPLE 3

The general procedure was as described for Example 1. A mixture of terephthalic acid (66.4 parts), isophthalic acid (265.8 parts) and hydrazine sulphate (257.6 parts) in 35% oleum (2289.6 parts) was reacted to give a 'precursor' copolymer solution which had a viscosity of 40.2 poises at 70° C and 18.5 poises at 90° C, and an inherent viscosity of 0.78.

After bromination with iodine (0.26 parts) and bromine (12 mls) the brominated copolymer contained 7.9% bromine, had an inherent viscosity of 0.64, and the solution had a viscosity of 39.2 poises at 70° C and 31.6 poises at 90° C.

Hydrazine sulphate (15.6 parts) was then added to give a final copolymer in solution containing 7.8% bromine, and an inherent viscosity of 2.19. The solution had a viscosity of 14,476 poises at 70° C and 9,087 at 90° C.

EXAMPLES 4 – 10

Using a similar procedure to Example 1, further brominated copolymer solutions were prepared, as illustrated in Table 1.

TABLE 1

| | 'PRECURSOR' COPOLYMER | | | | | | | BROMINATED COPOLYMER | | | | FINAL POLYMER | | |
|---|---|---|---|---|---|---|---|---|---|---|---|---|---|---|
| | | | | Oleum | | Polymer Concentration % | | | | | | | | |
| Ex. | Wt. of TA (g) | Wt. of IP (g) | Wt. of HS (g) | Strength % | Wt. (g) | | I.V. | Wt. of $I_2$ (g) | $Br_2$ (mls) | I.V. | % Br. | Wt. of HS (g) | I.V. | % Br. |
| 4 | 149.5 | 16.6 | 126.2 | 36.3 | 1144.5 | 10 | 0.54 | 0.25 | 19 | 0.41 | 20.2 | 10.4 | 2.34 | 19.6 |
| 5 | 149.5 | 16.6 | 126.2 | 45.1 | 856 | 12.5 | 0.64 | 0.25 | 19 | — | — | 10.4 | 2.07 | 18.0 |
| 6 | 149.5 | 16.6 | 126.2 | 55 | 664.5 | 15 | 0.67 | 0.25 | 19 | 0.57 | 18.3 | 10.4 | 2.85 | 17.3 |
| 7 | 149.5 | 16.6 | 126.2 | 30 | 1623 | 7.5 | 0.86 | 0.25 | 18 | 0.81 | 20.3 | 10.5 | 2.60 | 20.9 |
| 8 | 149.5 | 16.6 | 127.4 | 30 | 1623 | 7.5 | 0.97 | 0.25 | 18 | 0.87 | 20.7 | 9.2 | 2.27 | 20.3 |
| 9 | 149.5 | 16.6 | 128.7 | 30 | 1623 | 7.5 | 1.89 | 0.25 | 18 | — | — | 7.8 | 2.16 | 18.3 |
| 10 | 149.5 | 16.6 | 128.7 | 30 | 1623 | 7.5 | 1.58 | 0.25 | 19 | 1.40 | 22.8 | 7.8 | 3.44 | 23.3 |

TA = terephthalic acid
IP = isophthalic acid
HS = hydrazine sulphate
IV = inherent viscosity Inherent viscosity was determined in accordance with the formula $$\eta_{inh} = \frac{\ln \frac{(t\ soln.)}{(t\ soln.)}}{C}$$

where
- $t$ soln. is the flow time in a viscometer of a dilute solution of the polymer.
- $t$ solv. is the flowtime in a viscometer of the pure solvent.
- $C$ is the concentration of the polymer in solution; 0.5 gms. polymer in 100 mls of solution.

These measurements were made in 98% sulphuric acid at a temperature of 25° C.

The viscosity (poise) of a polymer solution was determined by the falling sphere method (see British Standards 188; 1957 Part 3). The viscosity obtained (in centistokes) was converted to poise using the relationship:

$$\text{poise} = \frac{\text{centistoke}}{100} \times D$$

where $D$ is the density (gm/cc) of the polymer solution.

What we claim is:

1. A method for the production of a brominated, polyphenylene-1,3,4-oxadiazole solution having a viscosity above the minimum for subsequent effective extrusion, which comprises
   a. forming a precursor solution of a polyphenylene-1,3,4-oxadiazole polymer by reacting at least one acid, selected from the group consisting of isophthalic acid and terephthalic acid, in oleum having a strength in the range 5 to 60%, with a compound selected from the group consisting of hydrazine and hydrazine salts in amounts such that the polymer has —COOH end groups making it capable of further polymerization, and the solution has a viscosity below the minimum for subsequent effective extrusion, b. adding bromine to the precursor solution to brominate the polymer; and then c. adding a compound selected from the group consisting of hydrazine and hydrazine salts to further polymerize the brominated polymer to an extent which effects an increase in the viscosity of the solution to or above the minimum for subsequent effective extrusion.

2. A method according to claim 1 wherein the acid is a mixture of terephthalic acid and isophthalic acid.

3. A method according to claim 1 wherein the acid is reacted with hydrazine sulphate.

4. A method according to claim 1, wherein the amount of bromine added is sufficient to give a bromine content in the polymer of the final solution of 5 to 30% by weight.

5. A method according to claim 1 wherein the precursor solution has a viscosity less than 200 poise at 70° C.

6. A method according to claim 4, wherein the amount of bromine added is sufficient to give a bromine content in the polymer of the final solution of 15 to 25% by weight.

* * * * *